(12) United States Patent
Sha et al.

(10) Patent No.: US 6,818,131 B2
(45) Date of Patent: Nov. 16, 2004

(54) SYSTEM AND PROCESS FOR CU-CMP WASTEWATER TREATMENT

(75) Inventors: Max Sha, Banchiau (TW); Howard Ting, Taipei (TW); Anderson Chen, Hualien (TW); Lung Chi Yang, Tainan (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 93 days.

(21) Appl. No.: 10/263,036

(22) Filed: Oct. 2, 2002

(65) Prior Publication Data

US 2004/0065621 A1 Apr. 8, 2004

(51) Int. Cl.[7] .................................................. C02F 3/08
(52) U.S. Cl. ........................ 210/616; 210/624; 210/631; 210/694; 210/638; 210/639; 210/651; 210/652; 210/728; 210/734; 210/735
(58) Field of Search ................................ 210/616, 624, 210/631, 694, 638, 639, 651, 652, 728, 734, 735

(56) References Cited

U.S. PATENT DOCUMENTS 4,292,176 A * 9/1981 Grutsch et al. .............. 210/616
6,428,705 B1 * 8/2002 Allen et al. .................. 210/638

* cited by examiner

*Primary Examiner*—Duane Smith
*Assistant Examiner*—Minh-Chau T. Pham
(74) *Attorney, Agent, or Firm*—Tung & Associates

(57) ABSTRACT

A system for the treatment of CMP wastewater, including wastewater from a copper CMP process. The wastewater treatment system includes a coagulant supply tank from which an FSC polymer coagulant is directed into a reaction tank that separately receives the untreated wastewater. The coagulant may be mixed with the untreated wastewater in selected ratios to provide a desired dosing quantity of the coagulant in the reaction tank. As the wastewater and the FSC polymer coagulant are mixed in the reaction tank, the coagulant flocs the slurry chemicals in the wastewater and removes the chemicals from solution in the wastewater as a precipitate before the wastewater is directed to a clarifier. The clarifier separates the flocked precipitate from the wastewater, and the flocked particles settle on the bottom of the clarifier to form a sludge. The sludge is re-distributed back into the clarifier to coagulate inert particles in the wastewater.

20 Claims, 1 Drawing Sheet

SYSTEM AND PROCESS FOR CU-CMP WASTEWATER TREATMENT

FIELD OF THE INVENTION

The present invention relates to chemical mechanical polishers used for polishing semiconductor wafers in the semiconductor fabrication industry. More particularly, the present invention relates to a new and improved system and process for treating wastewater from a chemical mechanical polisher used in the polishing of semiconductor wafers.

BACKGROUND OF THE INVENTION

In the fabrication of semiconductor devices from a silicon wafer, a variety of semiconductor processing equipment and tools are utilized. One of these processing tools is used for polishing thin, flat semiconductor wafers to obtain a planarized surface. A planarized surface is highly desirable on a shadow trench isolation (STI) layer, inter-layer dielectric (ILD) or on an inter-metal dielectric (IMD) layer, which are frequently used in memory devices. The planarization process is important since it enables the subsequent use of a high-resolution lithographic process to fabricate the next-level circuit. The accuracy of a high resolution lithographic process can be achieved only when the process is carried out on a substantially flat surface. The planarization process is therefore an important processing step in the fabrication of semiconductor devices.

A global planarization process can be carried out by a technique known as chemical mechanical polishing, or CMP. The process has been widely used on ILD or IMD layers in fabricating modern semiconductor devices. A CMP process is performed by using a rotating platen in combination with a pneumatically-actuated polishing head. The process is used primarily for polishing the front surface or the device surface of a semiconductor wafer for achieving planarization and for preparation of the next level processing. A wafer is frequently planarized one or more times during a fabrication process in order for the top surface of the wafer to be as flat as possible. A wafer can be polished in a CMP apparatus by being placed on a carrier and pressed face down on a polishing pad covered with a slurry of colloidal silica or aluminum.

A CMP process is frequently used in the planarization of an ILD or IMD layer on a semiconductor device. Such layers are typically formed of a dielectric material. A most popular dielectric material for such usage is silicon oxide. In a process for polishing a dielectric layer, the goal is to remove typography and yet maintain good uniformity across the entire wafer. The amount of the dielectric material removed is normally between about 5000 A and about 10,000 A. The uniformity requirement for ILD or IMD polishing is very stringent since non-uniform dielectric films lead to poor lithography and resulting window-etching or plug-formation difficulties. The CMP process has also been applied to polishing metals, for instance, in tungsten plug formation and in embedded structures. A metal polishing process involves a polishing chemistry that is significantly different than that required for oxide polishing.

Important components used in CMP processes include an automated rotating polishing platen and a wafer holder, which both exert a pressure on the wafer and rotate the wafer independently of the platen. The polishing or removal of surface layers is accomplished by a liquid polishing slurry consisting mainly of colloidal silica suspended in deionized water or KOH solution. The slurry is frequently fed by an automatic slurry feeding system in order to ensure uniform wetting of the polishing pad and proper delivery and recovery of the slurry. For a high-volume wafer fabrication process, automated wafer loading/unloading and a cassette handler are also included in a CMP apparatus.

As the name implies, a CMP process executes a microscopic action of polishing by both chemical and mechanical means. While the exact mechanism for material removal of an oxide layer is not known, it is hypothesized that the surface layer of silicon oxide is removed by a series of chemical reactions which involve the formation of hydrogen bonds with the oxide surface of both the wafer and the slurry particles in a hydrogenation reaction; the formation of hydrogen bonds between the wafer and the slurry; the formation of molecular bonds between the wafer and the slurry; and finally, the breaking of the oxide bond with the wafer or the slurry surface when the slurry particle moves away from the wafer surface. It is generally recognized that the CMP polishing process is not a mechanical abrasion process of slurry against a wafer surface.

While the CMP process provides a number of advantages over the traditional mechanical abrasion type polishing process, a serious drawback for the CMP process is the difficulty in controlling polishing rates at different locations on a wafer surface. Since the polishing rate applied to a wafer surface is generally proportional to the relative rotational velocity of the polishing pad, the polishing rate at a specific point on the wafer surface depends on the distance from the axis of rotation. In other words, the polishing rate obtained at the edge portion of the wafer that is closest to the rotational axis of the polishing pad is less than the polishing rate obtained at the opposite edge of the wafer. Even though this is compensated for by rotating the wafer surface during the polishing process such that a uniform average polishing rate can be obtained, the wafer surface, in general, is exposed to a variable polishing rate during the CMP process.

Recently, a chemical mechanical polishing method has been developed in which the polishing pad is not moved in a rotational manner but instead, in a linear manner. It is therefore named as a linear chemical mechanical polishing process, in which a polishing pad is moved in a linear manner in relation to a rotating wafer surface. The linear polishing method affords a more uniform polishing rate across a wafer surface throughout a planarization process for the removal of a film layer from the surface of a wafer. One added advantage of the linear CMP system is the simpler construction of the apparatus, and this not only reduces the cost of the apparatus but also reduces the floor space required in a clean room environment.

Wastewater from the liquid polishing slurry used in the chemical mechanical polishing process must be properly treated for the removal of copper and other chemicals, as well as slurry particles, from the slurry prior to disposal. A typical conventional wastewater treatment system 10 is shown schematically in FIG. 1. The wastewater treatment system 10 receives the wastewater from a CMP apparatus (not shown) during or after the CMP process. The wastewater treatment system 10 includes one or more wastewater collection tanks 12, each of which receives the wastewater through an inlet header 11 and wastewater inlet line 13. Some of the wastewater effluent from the treatment process is distributed into the inlet header 11 through an effluent return line 31 to dilute the wastewater in the collection tank or tanks 12. The wastewater is distributed from each collection tank 12 through a corresponding wastewater outlet line 14 and valve 16, and into a reaction tank 18 through a reaction tank inlet line 19. Sodium hydroxide (NaOH) base may be distributed into the reaction tank 18 through a base infusion line 20, and sulfuric acid ($H_2SO_4$) may be distributed into the reaction tank 18 through an acid infusion line 21, in various proportions to achieve a desired pH of the wastewater in the reaction tank 18. Selected quantities of PAC (polyaluminum chloride) coagulator are further distributed into the reaction tank 18 from a PAC supply 22. In the reaction tank 18, the PAC is rapidly mixed with the wastewater to bind or coagulate with the slurry chemicals in the wastewater and precipitate the chemicals out of solution. A reaction tank outlet line 24 distributes the wastewater, with PAC-bound precipitates, from the reaction tank 18 to a clarifier 25, which separates the PAC-bound precipitate particles from the wastewater and distributes the purified wastewater effluent to an effluent collection tank 27 through a clarifier outlet line 26. The PAC-bound slurry particles form a thick sludge which settles in the bottom of the clarifier 25, and the sludge is periodically removed from the clarifier 25 through a sludge removal line 34. Finally, the wastewater effluent is distributed to an effluent line 30 through an effluent outlet line 28 and typically through a valve or valves 29. Excess acid is removed from the effluent line 30 through an acidic waste drain line 32. Some of the effluent is returned to the inlet header 11 through the effluent return line 31, to dilute incoming wastewater in the collection tank or tanks 12, whereas most of the effluent is distributed through an effluent disposal line 33 to a facility disposal system (not shown).

While the PAC has been shown to adequately coagulate and precipitate out of solution chemicals in wastewater from slurry used in most chemical mechanical polishing applications, PAC has been found to inadequately precipitate chemicals, particularly copper cations, in wastewater from slurry used in copper CMP processes, due to the particular chemicals used in the Cu-CMP polishing slurry. This results in production of a wastewater effluent having a high copper content and poor wastewater quality. Accordingly, a new system and process is needed for properly precipitating slurry chemicals, particularly copper cations, in CMP wastewater for the proper treatment and disposal of the wastewater.

An object of the present invention is to provide a new and improved process for treating CMP wastewater.

Another object of the present invention is to provide a new and improved process which effectively removes slurry chemicals from CMP wastewater in the treatment and disposal of the wastewater.

Still another object of the present invention is to provide a new and improved system and process for treating CMP wastewater in a variety of CMP applications.

A still further object of the present invention is to provide a new and improved system and process which is effective in treating wastewater from a copper CMP process.

Yet another object of the present invention is to provide a process which utilizes FSC polymer as a coagulant to remove slurry chemicals from CMP wastewater.

Still another object of the present invention is to provide a system and process which mixes CMP wastewater effluent with FSC polymer coagulant to remove slurry chemicals from CMP wastewater.

Yet another object of the present invention is to provide a CMP wastewater treatment system which includes a sludge return line for returning sludge removed from CMP wastewater in the a clarifier to wastewater in the clarifier in order to utilize the returned sludge as a coagulator for the removal of inert particles from the wastewater.

SUMMARY OF THE INVENTION

In accordance with these and other objects and advantages, the present invention is generally directed to a system and process for the treatment of CU-CMP wastewater, including wastewater from a copper CMP process. In a preferred embodiment, the wastewater treatment system includes a coagulant supply tank from which an FSC polymer coagulant is directed into a reaction tank that separately receives the untreated wastewater. The coagulant may first be mixed with the untreated wastewater in selected ratios to provide a desired dosing quantity of the coagulant in the reaction tank. Accordingly, as the wastewater and the FSC polymer coagulant are vigorously mixed in the reaction tank, the coagulant flocs the slurry chemicals, particularly the copper cations, in the wastewater and effectively removes the chemicals from solution in the wastewater as a precipitate before the wastewater is directed to a clarifier. The clarifier separates the flocked precipitate from the wastewater, and the flocked particles settle on the bottom of the clarifier to form a sludge. Some of the sludge is redistributed back into the clarifier to coagulate inert particles in the wastewater. The result is a wastewater effluent which leaves the clarifier with a low copper content and high wastewater quality.

BRIEF DESCRIPTION OF THE DRAWINGS

The invention will now be described, by way of example, with reference to the accompanying drawings, in which.

DESCRIPTION OF THE PREFERRED EMBODIMENTS

The present invention has particularly beneficial utility in treating wastewater from a chemical mechanical polishing apparatus used in the polishing of semiconductor wafer substrates. However, the invention is not so limited in application, and while references may be made to such chemical mechanical polishing apparatus, the present invention is more generally applicable to treating wastewater in a variety of industrial applications.

Figure 1:
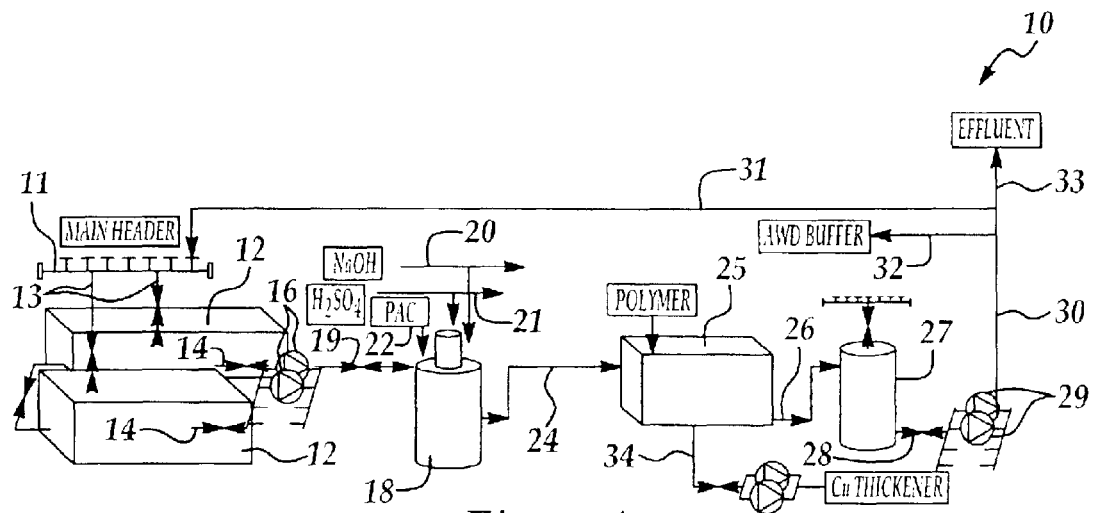
FIG. 1 is a schematic view of a typical conventional system for the treatment of CMP wastewater.
Figure 2:
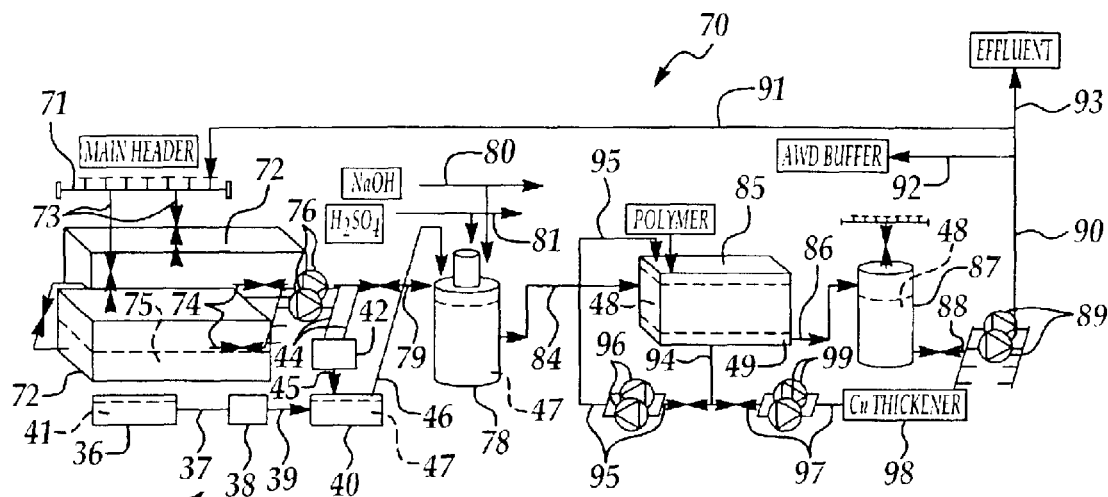
FIG. 2 is a schematic view of a CMP wastewater treatment system of the present invention.

Referring next to FIG. 2, an illustrative embodiment of the wastewater treatment system of the present invention is generally indicated by reference numeral 70 and includes one or more wastewater collection tanks 72, each of which is confluently connected to an inlet header 71 through a corresponding wastewater inlet line 73. The inlet header 71 receives raw or untreated slurry wastewater from a CMP apparatus (not shown). Wastewater outlet lines 74 are provided in fluid communication with a reaction tank 78 through a valve or valves 76 and a reaction tank inlet line 79. As shown, the wastewater outlet lines 74 may be confluently connected to one of a pair of wastewater lines 44 which connect a flow indicator 42 of a coagulant dosing system 35 to the reaction tank inlet line 79. A base infusion line 80 may be connected to the reaction tank 78 for the introduction of sodium hydroxide (NaOH) base into the reaction tank 78. An acid infusion line 81 may be further connected to the reaction tank 78 for the distribution of sulfuric acid ($H_2SO_4$) into the reaction tank 78. Accordingly, in application of the system 70 as hereinafter described, the sodium hydroxide and sulfuric acid may be introduced into the reaction tank 78 in various proportions to achieve a desired pH of the wastewater in the reaction tank 78. A reaction tank outlet line 84 connects the reaction tank 78 to a clarifier 85, which is connected to an effluent collection tank 87 through a clarifier outlet line 86. An effluent outlet line 88 connects the effluent collection tank 87 to an effluent line 90, typically through a pair of valves 89. An acidic waste drain line 92 may extend from the effluent line 90. An effluent return line 91 typically extends from the effluent line 90 to the inlet header 71. An effluent disposal line 93 extends from the effluent line 90, beyond the acidic waste drain line 92.

Figure 3:
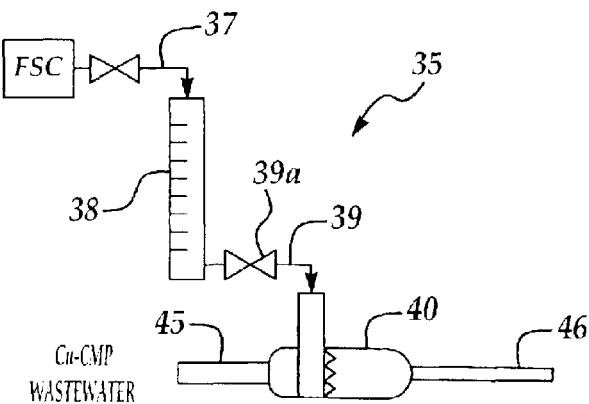
FIG. 3 is a schematic view illustrating a typical dosing system for the coagulant in implementation of the present invention.

Referring to FIGS. 2 and 3, in accordance with the present invention, a coagulant dosing system 35 is provided in the wastewater treatment system 70 for controlled infusion of an FSC polymer coagulant into the reaction tank 78. As shown in FIG. 2, the coagulant dosing system 35 includes a coagulant supply tank 36 which contains a supply of the liquid FSC polymer coagulant 41. The FSC polymer coagulent 41 is a strong cation flocculator which is capable of precipitating copper cations out of solution in the wastewater, as hereinafter further described. A polymer flow line 37, which may be fitted with a valve 37a, as shown in FIG. 3, connects the coagulant supply tank 36 to a flow controller 38. The flow controller 38 may be any type of flow controller known by those skilled in the art which is capable of controlling the flow volume of a liquid. A polymer flow line 39, which may be fitted with a valve 39a, connects the outlet end of the flow controller 38 to one of two inlets of a liquid mixer 40. A flow indicator 42 is connected to the reaction tank inlet line 79, typically through the wastewater lines 44, as heretofore described and shown in FIG. 2. The flow indicator 42 may be any type of flow indicator known by those skilled in the art capable of measuring and indicating the rate of flow of a liquid flowing therethrough. An outlet wastewater line 45 connects the outlet of the flow indicator 42 to a second inlet of the liquid mixer 40. Finally, a polymer entry line 46 extends from the outlet of the mixer 40 and is provided in fluid communication with the reaction tank 78, as further shown in FIG. 2.

Referring again to FIG. 2, and further in accordance with the present invention, a sludge removal line 94 extends from the bottom of the clarifier 85. A sludge return line 95 extends from the sludge removal line 94 and is connected to the wastewater inlet area of the clarifier 85. The sludge removal line 95 is typically fitted with one or a pair of valves 96. A sludge thickener line 97, typically fitted with a valve or valves 99, may further connect the sludge removal line 94 to a thickener supply 98 which contains a supply of copper thickener or other thickener for thickening the sludge to a solid form, typically in conventional fashion.

Referring again to FIG. 2, in typical application of the wastewater treatment system 70, during operation of a CMP apparatus (not shown), wastewater is generated from the polishing slurry as the slurry is used to polish a semiconductor wafer (not shown). The wastewater is distributed from the CMP apparatus to the wastewater treatment system 70, typically through the inlet header 71. Each of the wastewater collection tanks 72 receives and collects the raw wastewater 75 from the inlet header 71 through the respective wastewater inlet lines 73. The wastewater 75 is distributed from each collection tank 72 through the corresponding wastewater outlet line 74, valve 76 and reaction tank inlet line 79, respectively, and into the reaction tank 78.

As the raw wastewater 75 is distributed through the reaction tank inlet line 79 into the reaction tank 78, some of the raw wastewater 75 is distributed through the wastewater lines 44, through the flow indicator 42 and the outlet wastewater line 45, respectively, and into the liquid mixer 40 of the coagulant dosing system 35. Simultaneously, under control by the flow controller 38, FSC polymer coagulant 41 is distributed from the coagulant supply tank 36 through the polymer flow line 37, flow controller 38 and polymer flow line 39, respectively, and into the liquid mixer 40. The liquid mixer 40 is operated, typically in conventional fashion, to thoroughly mix and disperse the FSC polymer coagulant 41 in the wastewater 75 to define a polymer mixture 47 in the liquid mixer 40. Preferably, the FSC polymer coagulant 41 is mixed with the wastewater dispersing agent in a concentration of about 0.5% to about 5%, and preferably, about 1%, by weight, of the FSC polymer 41 in the wastewater 75 to define a polymer mixture 47. The polymer mixture 47 is distributed from the mixer 40, through the polymer entry line 46 and into the reaction tank 78. Sodium hydroxide (NaOH) base may be distributed into the reaction tank 78 through the base infusion line 80, and sulfuric acid ($H_2SO_4$) may be distributed into the reaction tank 78 through the acid infusion line 81, in various proportions to achieve a desired pH of the polymer mixture 47 in the reaction tank 78. A preferred range of pH for the polymer mixture 47 in the reaction tank 78 is 10–11. In the reaction tank 78, the polymer mixture 47, which includes the FSC polymer coagulant 41 dispersed in the wastewater 75, is rapidly mixed and agitated for a period of typically about 5 min. to about 20 min. to flocculate the slurry chemicals, particularly copper cations, in the polymer mixture 47. Accordingly, the slurry chemicals dissolved in the dispersant wastewater bind to the FSC polymer coagulant molecules and are precipitated out of solution in the polymer mixture 47. The reaction tank outlet line 84 distributes the flocculated polymer mixture 47, with FSC-bound slurry chemicals, from the reaction tank 78 to the clarifier 85. The clarifier 85 separates the FSC-bound chemicals from the wastewater in the polymer mixture 47 and distributes the purified wastewater effluent 48 to the effluent collection tank 87 through the clarifier outlet line 86. The PAC-bound slurry chemicals form a thick sludge 49 which settles in the bottom of the clarifier 85, and the sludge 49 flows from the clarifier 85 through the sludge removal line 94. Some of the sludge 49 is continually recycled back to the intake area of the clarifier 85 through the sludge return line 95 and valve or valves 96. In the clarifier 85, the recycled sludge 49 enters the purified wastewater effluent 48, where the sludge 49 binds inert particles remaining in the purified wastewater effluent 48. This enhances purification of the wastewater in the clarifier 85 as the sludge 49, with the inert slurry particles bound thereto, immediately fall to the bottom of the clarifier 85. The purified wastewater effluent 48 is distributed to the effluent line 90 through an effluent outlet line 88 and the valve or valves 89. Excess acid may be removed from the purified wastewater effluent 48 in the effluent line 90 through the acidic waste drain line 92. Some of the purified wastewater effluent 48 may be returned to the inlet header 71 through the effluent return line 91, to dilute incoming raw wastewater 75 in the collection tank or tanks 72, as desired. Most of the purified wastewater effluent 48 is typically distributed through the effluent disposal line 93 to a suitable facility disposal system (not shown).

It has been shown that the wastewater treatment system 70 of the present invention is capable of removing copper cations and other chemicals from the raw wastewater to form a purified wastewater effluent having a copper content of less than 10 mg/liter. This represents a substantial improvement in the quality of the wastewater as compared to that obtained using conventional wastewater treatment systems. It will be appreciated by those skilled in the art that the FSC polymer coagulant is capable of effectively operating over a wide range of system variations.

While the preferred embodiments of the invention have been described above, it will be recognized and understood that various modifications can be made in the invention and the appended claims are intended to cover all such modifications which may fall within the spirit and scope of the invention.

What is claimed is:

1. A wastewater treatment system for treating raw wastewater, comprising:
    a mixer for receiving a coagulant and a dispersant and mixing the coagulant with the dispersant to define a coagulant mixture;
    a reaction tank provided in fluid communication with said mixer for mixing said coagulant mixture with the raw wastewater;
    a reaction tank inlet line provided in fluid communication with said reaction tank for distributing raw wastewater to said reaction tank;
    at least one wastewater line extending between said reaction tank inlet line and said mixer for distributing a portion of the raw wastewater from said reaction tank inlet line to said mixer; and
    a clarifier provided in fluid communication with said reaction tank for receiving the coagulant mixture from said reaction tank and forming a wastewater effluent and a sludge from said coagulant mixture.

2. The system of claim 1 further comprising a sludge return line having a first end provided in fluid communication with said clarifier for receiving the sludge from said clarifier and a second end provided in fluid communication with said clarifier for depositing the sludge into the wastewater effluent in said clarifier.

3. The system of claim 1 further comprising at least one wastewater collection tank provided in fluid communication with said mixer for receiving the raw wastewater and distributing the raw wastewater to said mixer through said at least one wastewater line as the dispersant for the coagulant.

4. The system of claim 3 further comprising a sludge return line having a first end provided in fluid communication with said clarifier for receiving the sludge from said clarifier and a second end provided in fluid communication with said clarifier for depositing the sludge into the wastewater effluent in said clarifier.

5. The system of claim 3 further comprising an effluent return line provided in fluid communication with said clarifier and said at least one wastewater collection tank for diluting the raw wastewater in said at least one wastewater collection tank with the wastewater effluent.

6. The system of claim 5 further comprising a sludge return line having a first end provided in fluid communication with said clarifier for receiving the sludge from said clarifier and a second end provided in fluid communication with said clarifier for depositing the sludge into the wastewater effluent in said clarifier.

7. The system of claim 1 further comprising a supply of copper thickener provided in fluid communication with said clarifier for receiving the sludge from said clarifier and thickening the sludge.

8. The system of claim 7 further comprising a sludge return line having a first end provided in fluid communication with said clarifier for receiving the sludge from said clarifier and a second end provided in fluid communication with said clarifier for depositing the sludge into the wastewater effluent in said clarifier.

9. The system of claim 7 further comprising at least one wastewater collection tank provided in fluid communication with said mixer for receiving the raw wastewater and distributing the raw wastewater to said mixer through said at least one wastewater line as the dispersant for the coagulant.

10. The system of claim 9 further comprising a sludge return line having a first end provided in fluid communication with said clarifier for receiving the sludge from said clarifier and a second end provided in fluid communication with said clarifier for depositing the sludge into the wastewater effluent in said clarifier.

11. The system of claim 9 further comprising an effluent return line provided in fluid communication with said clarifier and said at least one wastewater collection tank for diluting the raw wastewater in said at least one wastewater collection tank with the wastewater effluent.

12. The system of claim 11 further comprising a sludge return line having a first end provided in fluid communication with said clarifier for receiving the sludge from said clarifier and a second end provided in fluid communication with said clarifier for depositing the sludge into the wastewater effluent in said clarifier.

13. A wastewater treatment system for treating raw wastewater, comprising:
    a reaction tank for mixing a coagulant with the raw wastewater to define a coagulant mixture;
    a clarifier provided in fluid communication with said reaction tank for receiving the coagulant mixture from said reaction tank and forming a wastewater effluent and a sludge from said coagulant mixture;
    a sludge return line having a first end provided in fluid communication with said clarifier for receiving the sludge from said clarifier and a second end provided in fluid communication with said clarifier for depositing the sludge into the wastewater effluent in said clarifier; and
    a supply of copper thickener provided in fluid communication with said clarifier for receiving the sludge from said clarifier and thickening the sludge.

14. The system of claim 13 further comprising a mixer provided in fluid communication with said reaction tank for mixing the coagulant with a dispersant.

15. The system of claim 14 further comprising at least one wastewater collection tank provided in fluid communication with said mixer for receiving the raw wastewater and distributing a portion of the raw wastewater to said mixer as the dispersant for the coagulant.

16. The system of claim 15 further comprising a flow indicator between said at least one wastewater collection tank and said mixer for measuring and indicating flow of the raw wastewater into said mixer.

17. A process for treating raw wastewater, comprising the steps of:
    providing a supply of raw wastewater;
    separating a first portion from a remaining portion of the raw wastewater;
    mixing a coagulant with the first portion of the raw wastewater in a selected proportion to define a coagulant mixture;
    removing chemicals from the remaining portion of the raw wastewater by flocculating said coagulant mixture with the remaining portion of the raw wastewater;

forming a wastewater effluent and a sludge from said coagulant mixture; and removing inert particles from the wastewater effluent by distributing the sludge through the wastewater effluent.

18. The process of claim 17 wherein said selected proportion comprises about 0.5% to about 5.0% by weight of the coagulant in the coagulant mixture.

19. The process of claim 17 wherein said coagulant comprises FSC polymer coagulant.

20. The process of claim 19 wherein said selected proportion comprises about 0.5% to about 5.0% by weight of the coagulant in the coagulant mixture.

* * * * *